(12) United States Patent
SenGupta et al.

(10) Patent No.: US 9,120,093 B2
(45) Date of Patent: Sep. 1, 2015

(54) HYBRID ANION EXCHANGER IMPREGNATED WITH HYDRATED ZIRCONIUM OXIDE FOR SELECTIVE REMOVAL OF CONTAMINATING LIGAND AND METHODS OF MANUFACTURE AND USE THEREOF

(71) Applicants: Arup K. SenGupta, Bethlehem, PA (US); Surapol Padungthon, Bethlehem, PA (US)

(72) Inventors: Arup K. SenGupta, Bethlehem, PA (US); Surapol Padungthon, Bethlehem, PA (US)

(73) Assignee: LEHIGH UNIVERSITY, Bethlehem, PA (US)

( * ) Notice: Subject to any disclaimer, the term of this patent is extended or adjusted under 35 U.S.C. 154(b) by 0 days.

(21) Appl. No.: 13/860,984

(22) Filed: Apr. 11, 2013

(65) Prior Publication Data

US 2013/0274357 A1    Oct. 17, 2013

Related U.S. Application Data

(60) Provisional application No. 61/623,138, filed on Apr. 12, 2012.

(51) Int. Cl.
*B01J 49/00*    (2006.01)
*C01G 56/00*    (2006.01)
*B01J 41/12*    (2006.01)

(52) U.S. Cl.
CPC ........................................ *B01J 41/12* (2013.01)

(58) Field of Classification Search
CPC ..... B01D 59/30; B01J 41/26; C22B 60/0265; C01G 25/02
USPC ...................................... 521/26, 28; 423/6, 7
See application file for complete search history.

(56) References Cited

U.S. PATENT DOCUMENTS 4,284,726 A * 8/1981 Shigetomi ........................ 521/28
7,291,578 B2    11/2007 SenGupta et al.

OTHER PUBLICATIONS

Toshishige M. Suzuki, et al.; Preparation of porous resin loaded with crystalline hydrous zirconium oxide and its application to the removal of arsenic.
Reactive & Functional Polymers 43 (2000) 165-172.

* cited by examiner

*Primary Examiner* — William Cheung
(74) *Attorney, Agent, or Firm* — Saul Ewing, LLP

(57) ABSTRACT

Polymeric anion exchanger are used as host materials in which sub-micron sized hydrated Zr(IV) oxides (HZrO) particles are irreversibly dispersed within the ion exchange medium, such as beads or fibers. The HZrO can be impregnated into the pore structure of resin by mixing the parent anion exchange resin with zirconium solution prepared by pre-calcined zirconium oxide dissolved in concentrated mixture of alcohol and acid, and then followed by precipitation of HZrO particles within the resin by using alkaline solution. Since the anion exchangers have positively charged such as quaternary ammonium functional groups, anionic ligands such as arsenate, fluoride can transport in and out of the gel phase without subjected to the Donnan exclusion effect. Consequently, anion exchanger-supported HZrO submicron particles exhibit significantly greater capacity to remove arsenic and fluoride in comparison with parent anon exchange resins. Known cation exchange resins as support materials do not offer high arsenic or fluoride removal capacity.

21 Claims, 12 Drawing Sheets

HYBRID ANION EXCHANGER IMPREGNATED WITH HYDRATED ZIRCONIUM OXIDE FOR SELECTIVE REMOVAL OF CONTAMINATING LIGAND AND METHODS OF MANUFACTURE AND USE THEREOF

CROSS REFERENCE TO RELATED APPLICATIONS

This application claims priority to U.S. Provisional patent application Ser. No. 61/623,138 filed Apr. 12, 2012.

FIELD OF THE INVENTION

The invention relates to the manufacture and application of hybrid anion exchangers having amorphous zirconium oxide particles, preferably nanoparticles, for selective removal of contaminants from fluids.

BACKGROUND OF THE INVENTION

In order to remove trace contaminants from water, a fixed-bed sorption process is desirable, since it is operationally simple, requires virtually no startup time, and is forgiving toward fluctuations in feed compositions. However, in order for a fixed-bed process to be viable, economically competitive, and sustainable, the sorbent must exhibit high selectivity toward the target contaminant, must be durable, and must be amendable to efficient regeneration and reuse. More importantly, the spent adsorbent should not pose a risk of leaching of toxic contaminants after disposal into the environment, such as a landfill. For all these reasons, there exist unmet needs for new inventive, environmentally friendly apparatus and methods of removing trace contaminants from water.

SUMMARY OF THE INVENTION

Provided herein are methods of preparing a hybrid anion exchange resin. In an example, the method comprises the steps of: preparing a zirconium solution by dissolving zirconium oxide into a solution comprising an organic solvent and an acid; bringing a polymeric anion exchange resin in contact with the zirconium solution to form a resin-zirconium material; drying the resin-zirconium material; subsequently contacting the dried resin-zirconium material with an aqueous alkaline solution to precipitate a zirconium compound within a gel phase of the anion exchange resin; and after the step of contacting, washing the anion exchange resin an aqueous wash liquid, followed by optionally rinsing with a non-aqueous rinse liquid, and then drying to yield a dried zirconium-impregnated anion exchange resin impregnated with at least one of a an oxygen-containing compound of zirconium, wherein the zirconium-impregnated anion exchange resin is suitable for use in removing at least one contaminant from a liquid, the contaminant selected from the group consisting of arsenate, arsenite, fluoride, phosphate, and selenite and combinations thereof. Other embodiments will be apparent from the specification, claims, and figures herein.

BRIEF DESCRIPTION OF THE DRAWINGS

FIG. 2 is composite predominance diagrams of Fe—As and Zr—As;

DETAILED DESCRIPTION OF THE PREFERRED EMBODIMENTS

Figure 1:
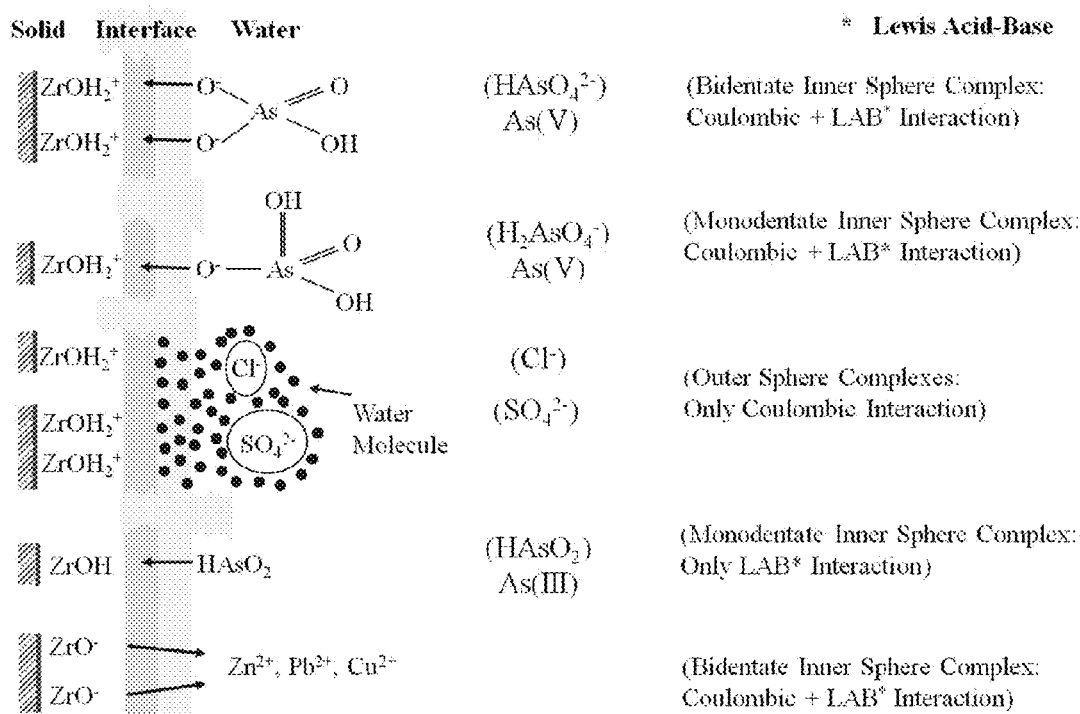
FIG. 1 is a schematic diagram illustrating the binding of various of solutes onto hydrated metal oxides.

Polyvalent metal oxides, namely Al(III), Fe(III), and Zr(IV), exhibit amphoteric sorption behaviors. For example, they can selectively bind Lewis bases or anionic ligands (e.g. arsenates and phosphates) as well as Lewis acids or transition-metal cations (e.g. $Zn^{2+}$, $Cu^{2+}$, and $Pb^{2+}$) through the formation of inner sphere complexes. Other competing species, such as chloride or sulfate, exhibit poor sorption affinity toward these metal oxides. FIG. 1 shows an illustration of the binding of various contaminants onto metal oxides. Of them, hydrated Fe(III) oxide (HFO) has been studied extensively because it is innocuous, inexpensive, readily available. See, e.g. Suzuki, T. M., J. O. Bomani, et al (2000). "Preparation of porous resin loaded with crystalline hydrous zirconium oxide and its application to the removal of arsenic." Reactive and Functional Polymers 43(1-2): 165-172 Compared to HFO, zirconium oxide is more chemically stable under reducing environment and thus unlikely to leach arsenic or fluoride when disposed in landfills.

Because sorption or binding sites reside only on the surface, the nano-scale metal oxide particles with a very high surface-to-volume ratio offer a significantly enhanced sorption capacity. Although the freshly precipitated metal oxides exhibit high removal capacity, such fine submicron particles and their aggregate are not feasible to use in fixed-bed or any flow through systems due to excessive pressure drops and poor mechanical strength. Granulated metal oxides have been recently prepared and successfully used in fixed bed columns such as Granulated Ferric Hydroxide (GFH), Granular titanium Oxide (GTO), etc. However, the granulated inorganic metal oxides are not amenable to efficient regeneration and tend to form fine particles hence, they are mostly recommended for single-use applications. Moreover, the exhausted materials generate a waste contaminated with high concentration of toxic arsenic and pose a significant risk to the environment.

In order to overcome these limitations, hybrid nanosorbents have been developed to create synergy between high selectivity from metal oxide nanoparticles and to have high mechanical strength and enhanced ions transport from polymeric ion exchange supports. In prior studies, attempts have been made to disperse HFO nanoparticles within various support materials, namely, alginate, zeolite, and activated carbon. Only recently, however, there were shown that the ligands sorption capacity can be greatly enhanced by disperse HFO nanoparticles within polymeric anion exchangers. Such an enhancement in sorption capacity results from the Donnan membrane exerted by the fixed positively charge from the functional groups of polymeric ion exchangers. Although HFO has been developed and extensively use to make hybrid nanosorbents, iron based hybrid sorbents cause arsenic leaching especially in the reducing environment due to instability of iron. Moreover, iron based hybrid materials exhibit low affinity for fluoride which tends to present one order of magnitude higher concentration than arsenic. Other environmentally benign metal oxides, such as Zr(IV), also exhibit high sorption affinity toward anionic ligands such as fluoride, arsenate. Unlike Fe(III), these metal oxides are chemically stable under wide pH ranges and reduction, and exhibit high affinity toward fluoride so that it is safe to dispose in the reducing environment of landfills and suitable for application where fluoride also presence in water.

An objective of the invention is to provide a novel and more chemically stable zirconium oxide impregnated into appropriate type of polymer support for selective removal of arsenic and fluoride species, and to provide a method of using inexpensive startup zirconium and effectively preparing Zr solution and loading hydrated Zr(IV) oxide onto an anion exchange resin.

Figure 2:
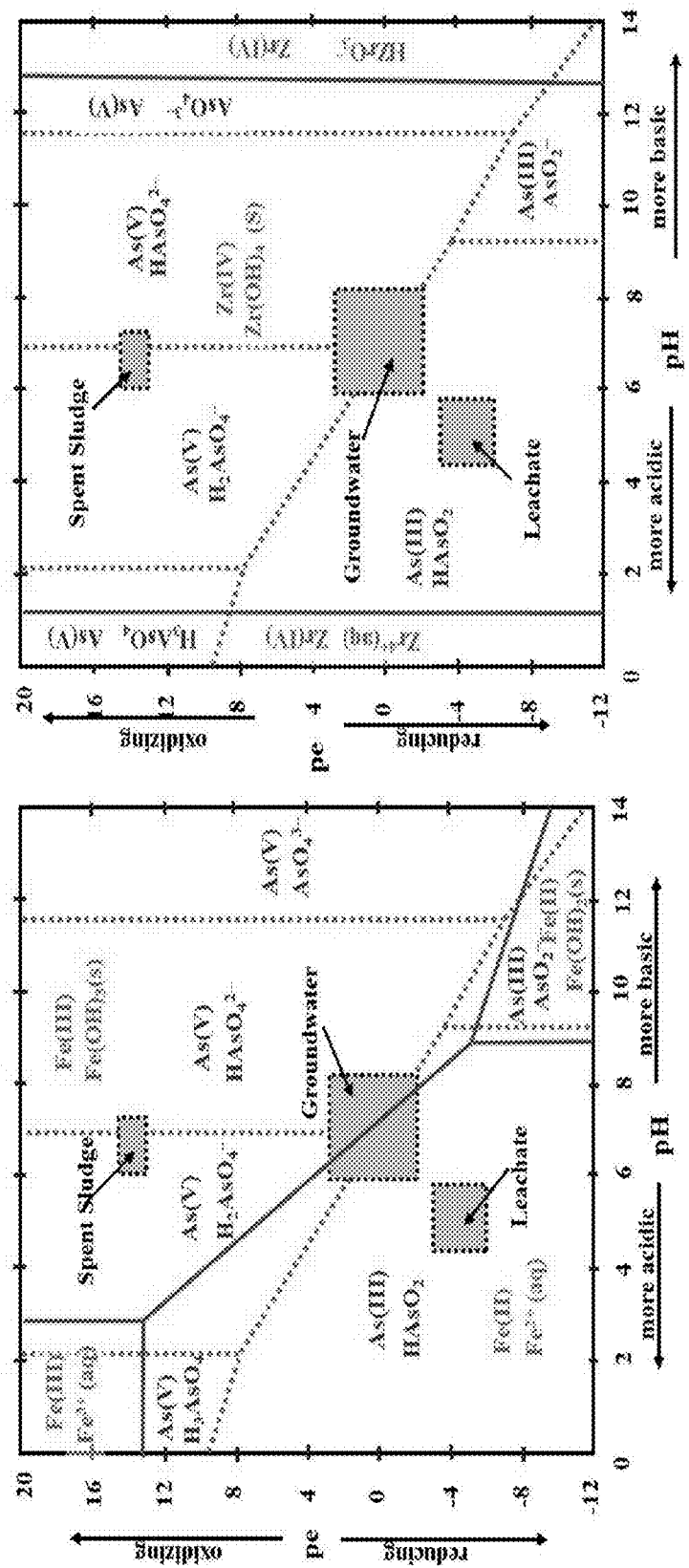

Unlike HFO, the hydrated Zr(IV) oxide (HZrO) nanoparticles offer several unique characteristics that make them better than the iron based nanosorbents developed earlier in U.S. Pat. No. 7,291,578 B2. HZrO is very stable over wide pH ranges and in both oxidizing and reducing environments and is therefore safe to dispose the used materials into landfills. FIG. 2 shows composite predominance diagram of Fe—As and Zr—As. Moreover, HZrO can remove fluoride effectively while iron based hybrid sorbent has very low affinity toward fluoride.

The present inventive methods accordingly aim to provide a method to impregnate an anion exchange resin with hydrated Zr(IV) oxide particles. Instead of using hazardous and difficult-to-transport zirconium oxychloride ($ZrOCl_2$) or zirconium oxynitrate ($ZrO(NO_3)_2$) or any soluble zirconium salts, zirconium oxide, which is solid, innocuous and easily transportable, is used as the feed zirconium material. Thus, the adsorbent or the hybrid anion exchanger material can be synthesized in place of applications without significant difficulty. Preferably, inexpensive pre-calcined zirconium oxide which is water insoluble will be used as a zirconium source. In one embodiment the solution of acid and organic solvent will be used to dissolved these zirconium oxide.

The methods herein for preparation of hybrid anion exchange resin impregnated with hydrated Zr(IV) oxide comprised the steps of:
(1) preparing zirconium solution by dissolving zirconium oxide into mixed solution of organic solvent and acid;
(2) bringing a polymeric anion exchange resin in contact with organic solvent/acid solution containing zirconium compound;
(3) air-drying the material and subsequently bringing it in contact with an aqueous alkaline solution to precipitate the zirconium compound within the gel phase of the anion exchange resin; and
(4) the material is washed with water followed by acetone rinsing, and then air-drying at room temperature.

The adsorbent thus produced comprises a polymeric anion exchange resin containing dispersed particles of an oxygen-containing compound of zirconium in nanoscale, and is capable of selective removal of ligands from fluid stream brought into contact with the hybrid adsorbent. The adsorbent is especially effective in removing ligands such as arsenates, arsenites, fluoride, selenites, and vanadates from a stream of drinking water, groundwater, industrial process water or industrial effluent. In the past, non-functionalized polymeric sorbents have been impregnated with crystalline zirconium salts (1). In our invention, we have used anion exchange resin as the host material to take advantage of the Donnan membrane effect. Secondly, we have demonstrated that we produced amorphous zirconium oxide that did not turn crystalline over multiple cycles of operation. We postulate that the gel phase of the anion exchange resin containing highly charged quaternary ammonium functional groups is conducive to maintaining amorphous structure of zirconium oxide with greater concentration of surface sorption sites.

The zirconium compound as the starting material of the novel material is water insoluble pre-calcined zirconium oxide. The organic solvent mixed with acid solution is used to dissolve zirconium oxide. The organic solvent is preferably methyl alcohol and acid is preferably sulfuric acid or hydrochloric acid in order to achieve the maximum solubility of dissolved zirconium compound.

As a first step, zirconium oxide dissolved in 10% sulfuric acid is loaded onto an anion exchange resin with quaternary ammonium functional groups in chloride form, available from The Purolite Company of Bala Cynwyd, Pa. The loading of the polymeric ion exchange resin beads or fibers are carried out by shaking the mixed resin and zirconium solution in the rotary shaker. Anion exchanger resin beads and fibers from other manufacturers may also be used. Particles sizes of the anion exchange resin beads are preferably in the range from 300-1000 μm and the diameter of anion exchange fibers varied preferably in the range from 20-100 μm. The second step is impregnation of hydrated zirconium oxide into the pore structure of the anion exchange resin. During this step, the decanted resin from step 1 is brought into contact with alkaline solution. The third step is washing and drying. Anion exchanger beads or fibers from the second step are washed with tap water followed by acetone wash, and air dried for 24 hours. These steps can be repeated to achieve greater Zr(IV) loading. HZrO agglomerates were irreversibly encapsulated within the spherical anion exchanger beads. Turbulence and mechanical stirring do not result in any noticeable loss of HZrO particles.

Figure 3:
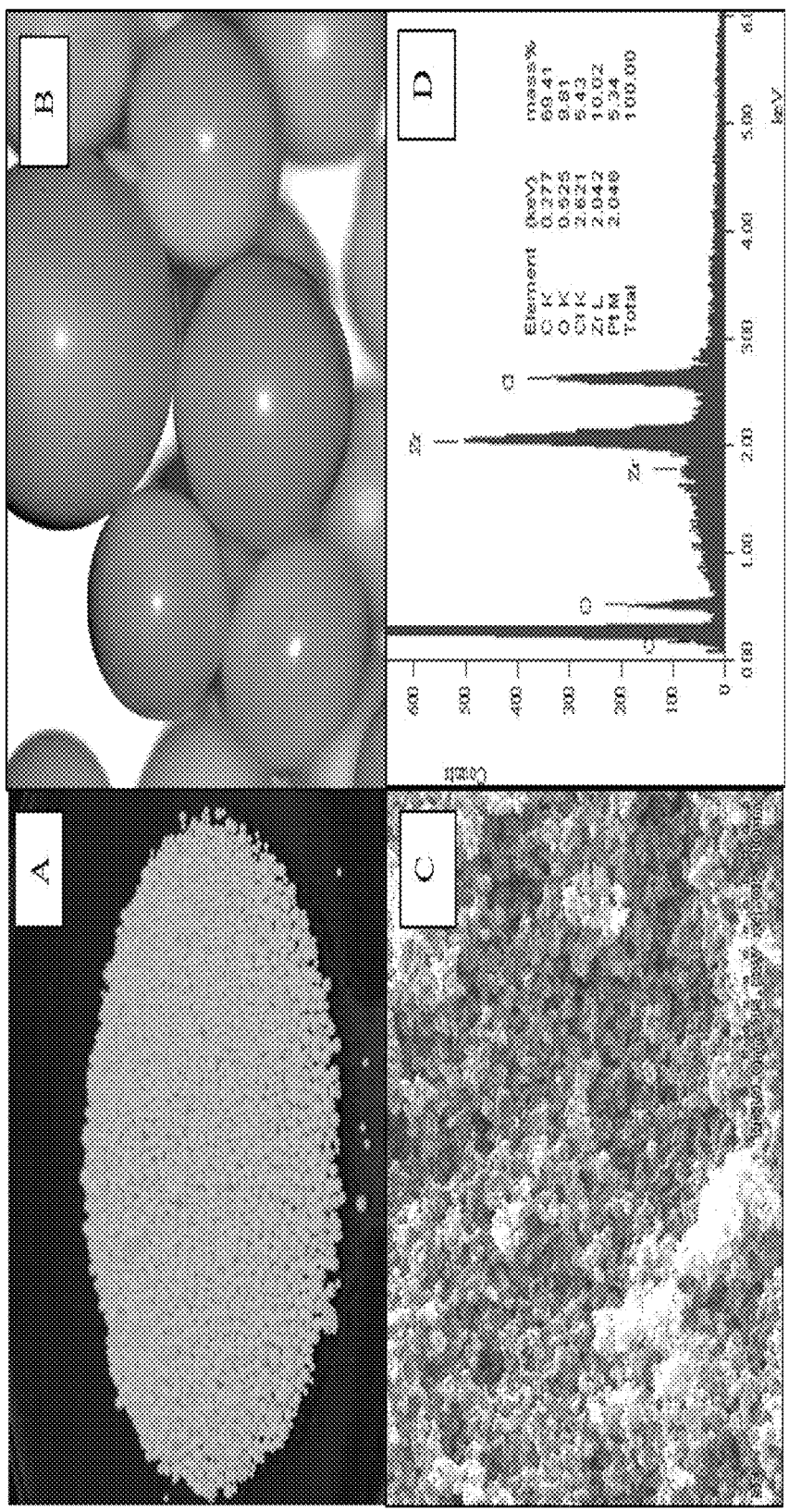
FIG. 3 shows HAIX-Zr bead and scanning electron microphotograph (SEM) including EDX analysis.
Figure 4:
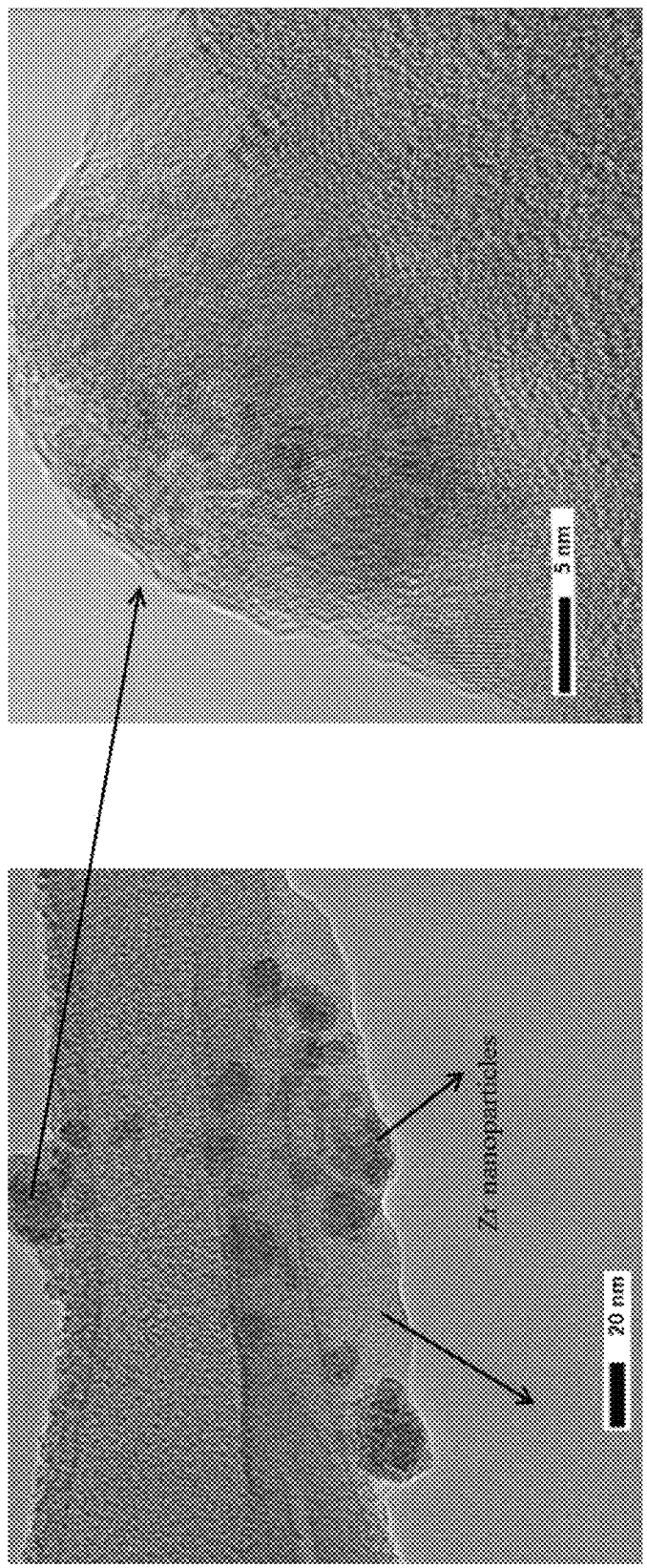
FIG. 4 shows transmission electron microphotograph (SEM) of Hybrid Anion Exchanger impregnated with HZrO (HAIX-Zr)

Both gel and macroporous anion exchanger (Purolite A-400 and A-500P) were used in the study. Mass loading of HZrO onto the anion exchanger varied from 10-15% as Zr. FIG. 3 shows scanning electron microphotograph (SEM) of Hybrid Anion Exchanger impregnated with HZrO (HAIX-Zr). FIG. 4 shows transmission electron microphotograph (TEM) of HAIX-Zr, in which the presence of macropores can be readily observed in SEM. Nano-sized HZrO particles in the hybrid material can be observed from the TEM.

While the polymeric anion exchanger beads or fibers exhibits excellent hydraulic properties and durability during fixed-bed column runs, the dispersed HZrO submicron particles serve as active sorbents for target ligands. The positively charged functional groups in anion exchange resin enhance the passage of anionic ligands into the resin from the aqueous phase where HZrO is dispersed in the resin.

By way of example, details of the steps carried out in a typical laboratory synthesis of hybrid anion exchanger impregnated with HZrO are as follows. In a 100 ml container filled with 50 ml of zirconium solution in 10% sulfuric acid, 25 g of Purolite anion exchanger resin was added and the suspension shaken for 4 h. The zirconium solution was prepared by adding zirconium hydroxide 10 g. in 100 ml. of mixed-solution of 50:50 of methanol: 25% of $H_2SO_4$. Thereafter, the material was withdrawn from the solution, air dried for 4 h, and then brought in contact with 100 ml of 10% NaOH solution for 1 h. The modified resin (hybrid anion exchanger) was then rinsed several times with deionized water follow by acetone rinsing, and air dried at room temperature for 24 h. These steps were repeated for second and third cycle of zirconium loading. Following each cycle, sample of 5 g of hybrid anion exchanger were taken for zirconium content analysis.

Both macroporous and gel type anion exchangers from The Purolite Company, namely, Purolite A-500P and A-400, were used as the parent materials. The zirconium loading content of HAIX-Zr were found by digesting twice with 50% sulfuric acid for 24 h. The zirconium content values at the end of each cycle of preparation were as follows in TABLE 1:

TABLE 1

| | Zirconium content* (mg/g of hybrid anion exchanger) | |
|---|---|---|
| Cycle | HAIX-Zr (from parent macro-porous A500P) | HAIX-Zr (from parent gel A400) |
| 1 | 50.5 | 32.0 |
| 2 | 90.0 | 51.0 |
| 3 | 110.0 | 60.0 |

*Based on dried hybrid anion exchange beads

Figure 5:
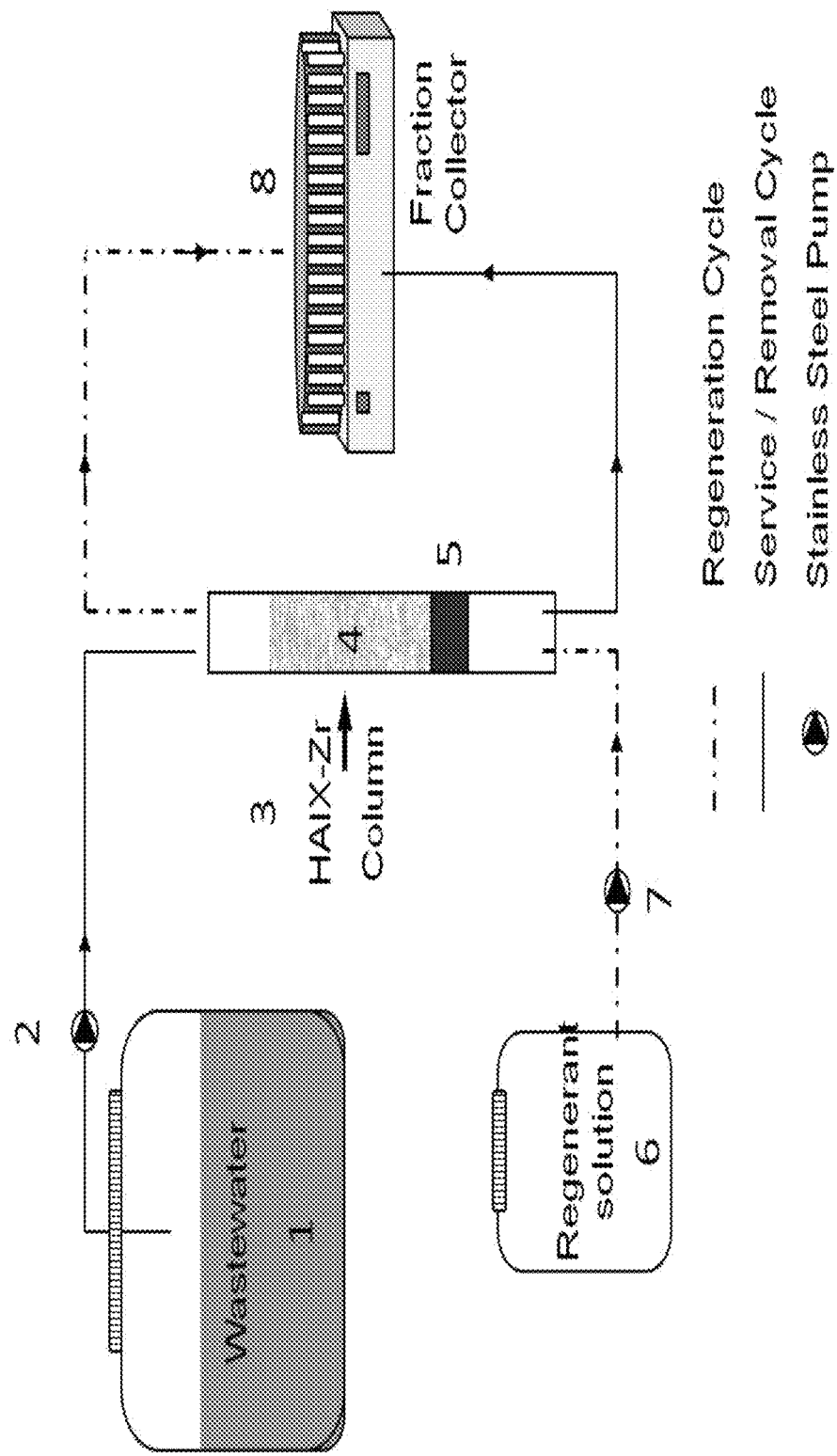
FIG. 5 is a schematic diagram of a set-up for fixed bed column runs and regeneration test.

In the evaluation of the performance of HAIX the following experimental protocol was used. A series of fixed bed experiments were carried out to evaluate As(V), As(III), and Fluoride removal capacities of HAIX-Zr. The experimental set-up is illustrated in FIG. 5, where the contaminated water from a reservoir 1 was pumped by a pump 2 into a column 3 containing HAIX-Zr bead 4 over a glass fiber layer 5. Regenerant in reservoir 6 was pump into the column by pump 7. The effluent was collected in effluent sample tubes 8.

Figure 6:
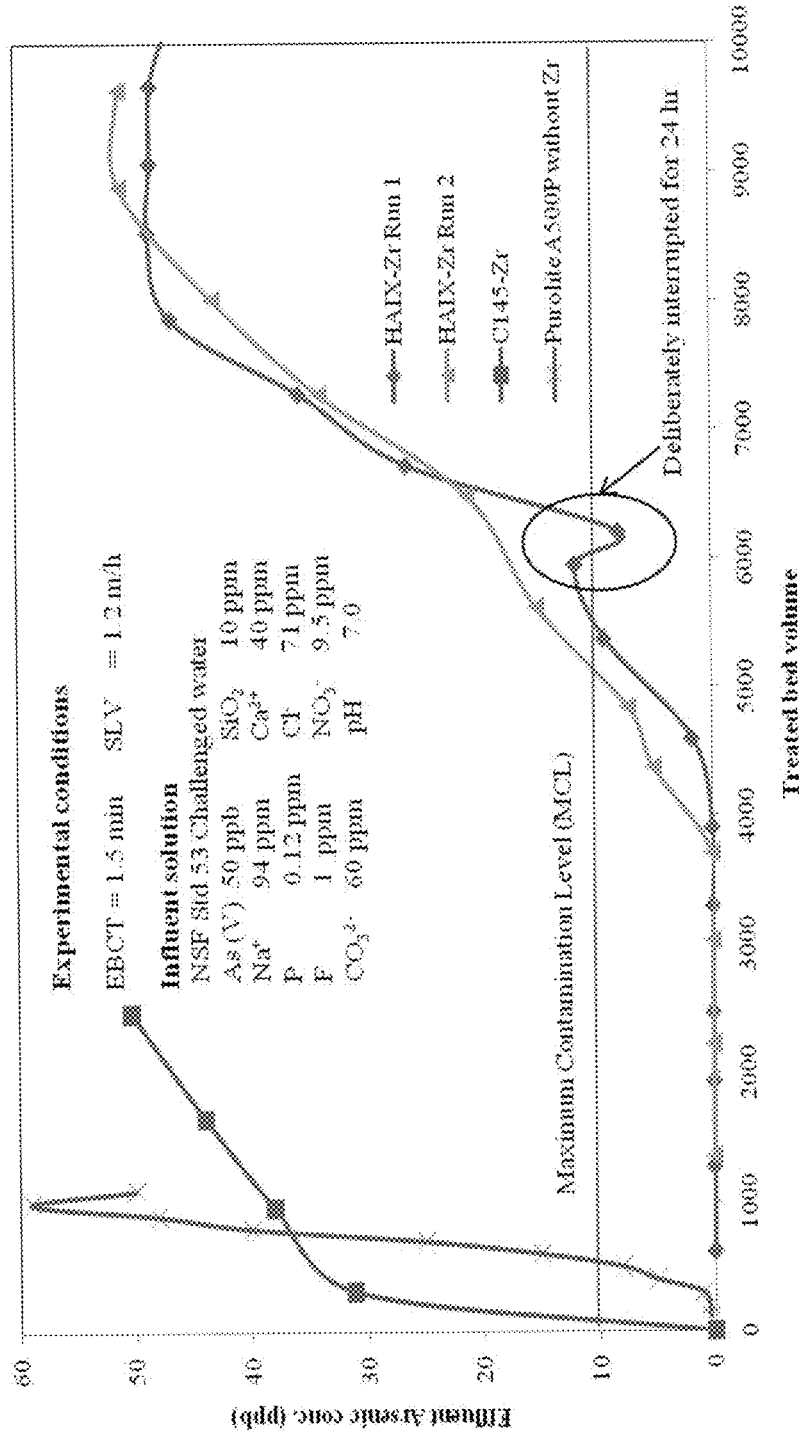
FIG. 6 is a graph of the effluent history for arsenic during column run using three different materials.

Using this experimental set-up, tests were also conducted to validate the ability of HAIX-Zr to remove fluoride. The following results are noteworthy. FIG. 6 provides As(V) effluent histories for three separate column run under nearly identical conditions using respectively parent anion macroporous exchanger Purolite A-500P in chloride form, HZrO loaded macroporous cation exchanger, and Hybrid Anion Exchanger of HAIX-Zr. The abscissa represents the effluent arsenic concentration. The empty bed contact time (EBCT) was 1.5 minutes. The influent solution contained 50 µg/L of As(V), 10 ppm $SiO_2$ and other dissolved solutes as shown in the figure. The influent pH was 7.0. As shown in the figure, the HZrO loaded cation exchanger was unable to remove As(V). For the parent anion exchanger, arsenic breakthrough occurred at around 500 bed volumes. On the contrary, the hybrid anion exchanger, HAIX-Zr, removed arsenic very well. Arsenic breakthrough of 10 parts per billion (Maximum Contamination Level or MCL) occurred after 6,000 bed volumes, all other conditions being identical.

Figure 7:
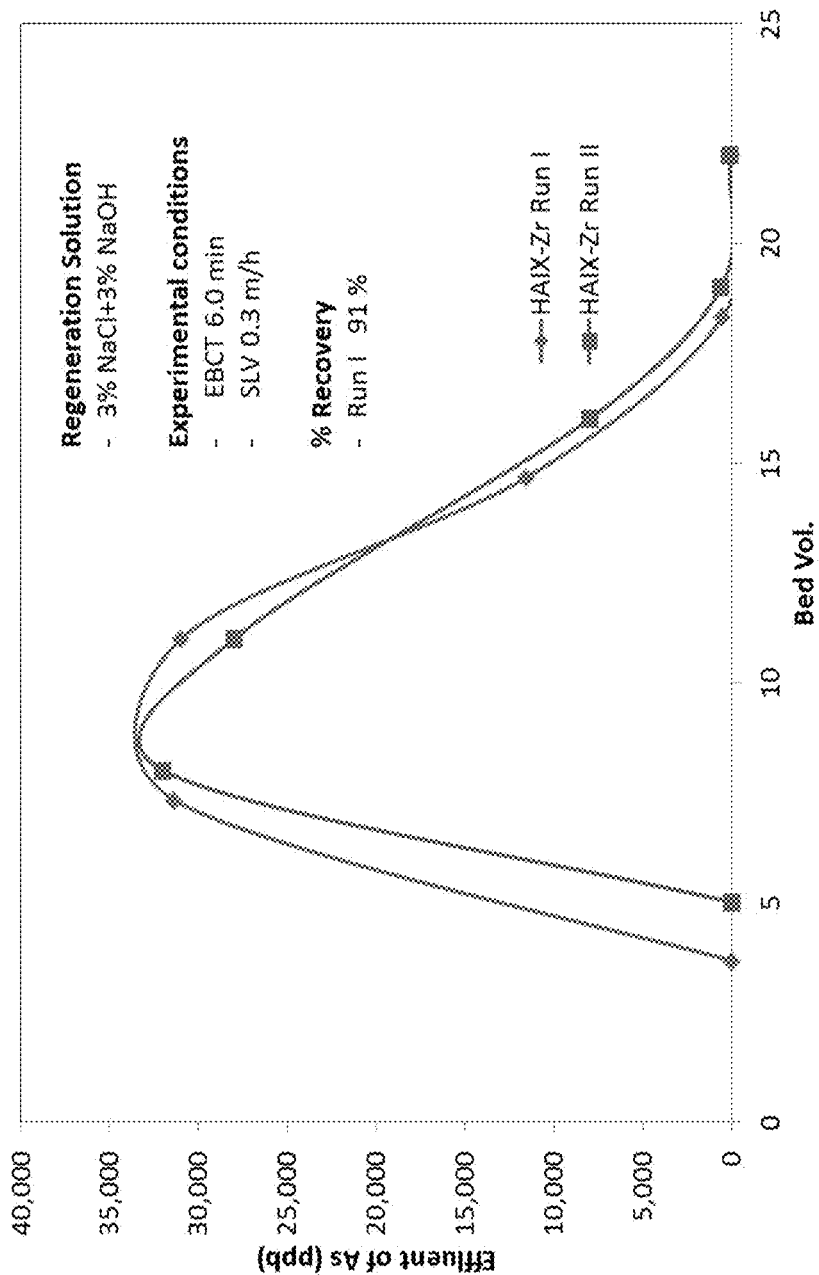
FIG. 7 is a graph showing the concentration profiles of arsenic during regeneration of a macroporous hybrid anion exchanger (HAIX-Zr)

An Arsenic loaded HAIX-Zr column can be very efficiently regenerated using a solution of 3% NaCl and 2% NaOH at pH of 12 and with an EBCT of 6.0 minutes. As shown in FIG. 7, over 84% of arsenic was desorbed within 20 bed volumes. FIG. 6 also shows the effluent histories for arsenic in two successive column runs using the same feed water. The arsenic effluent histories remained essentially the same. The results provide evidence that HAIX-Zr can be regenerated and reused for multiple cycles without a significant loss in arsenic removal capacity.

Figure 8:
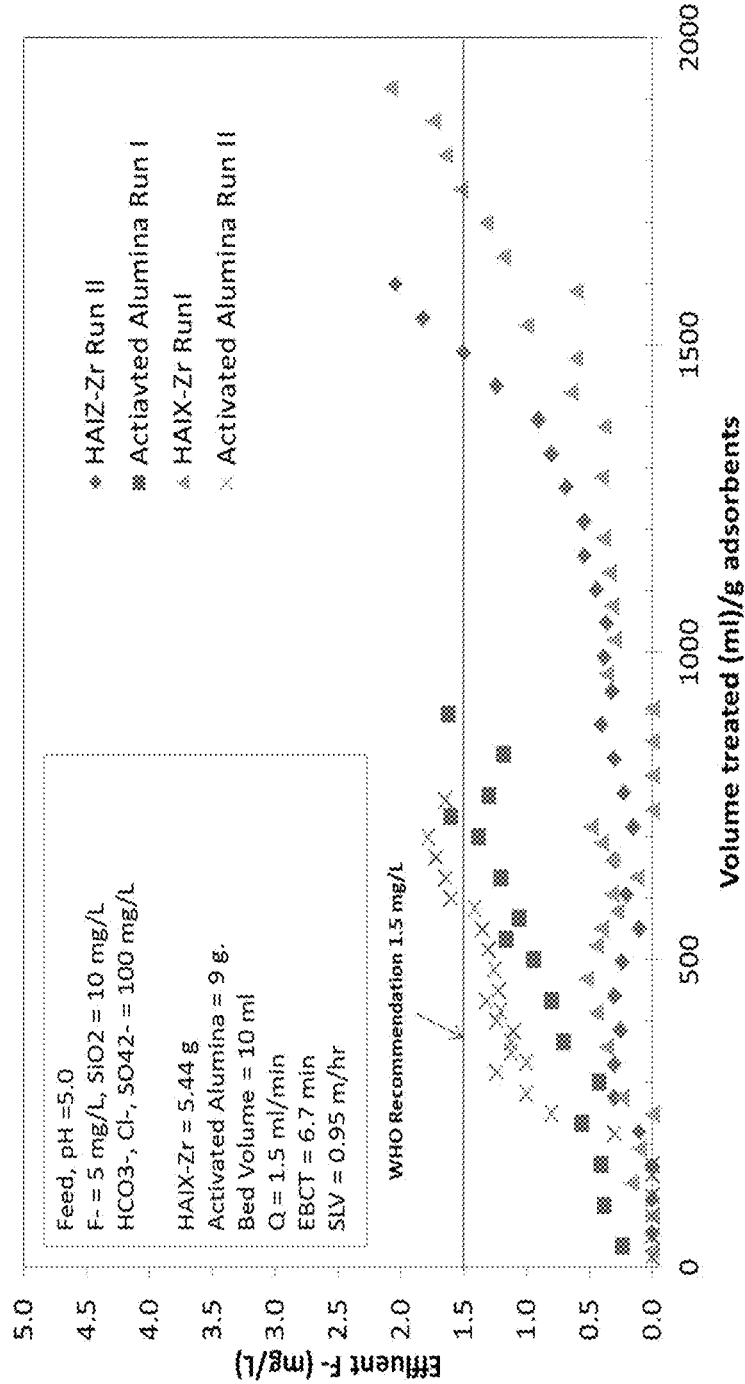
FIG. 8 is a graph showing breakthrough profiles for fluoride during column runs.
Figure 9:
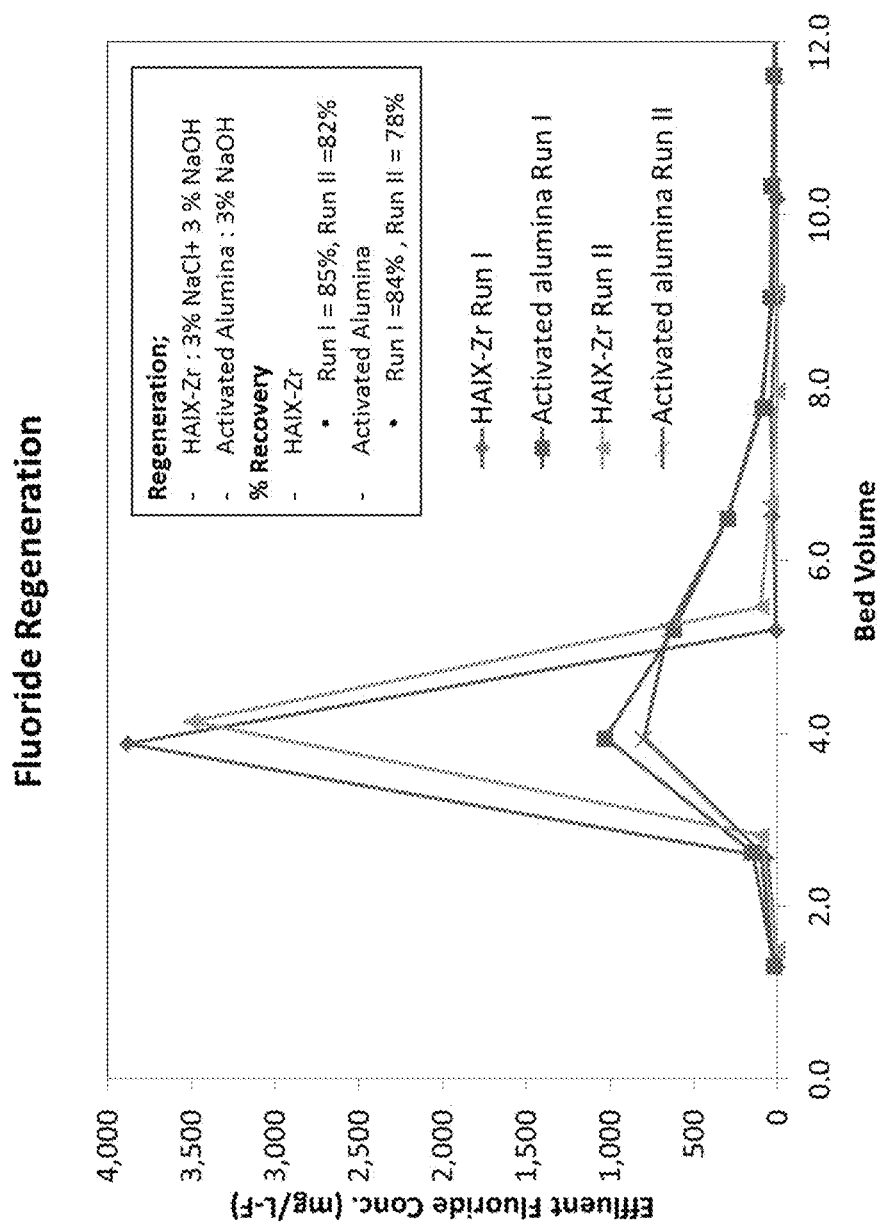
FIG. 9 is a graph showing regeneration profiles after runs in FIG. 8.
Figure 10:
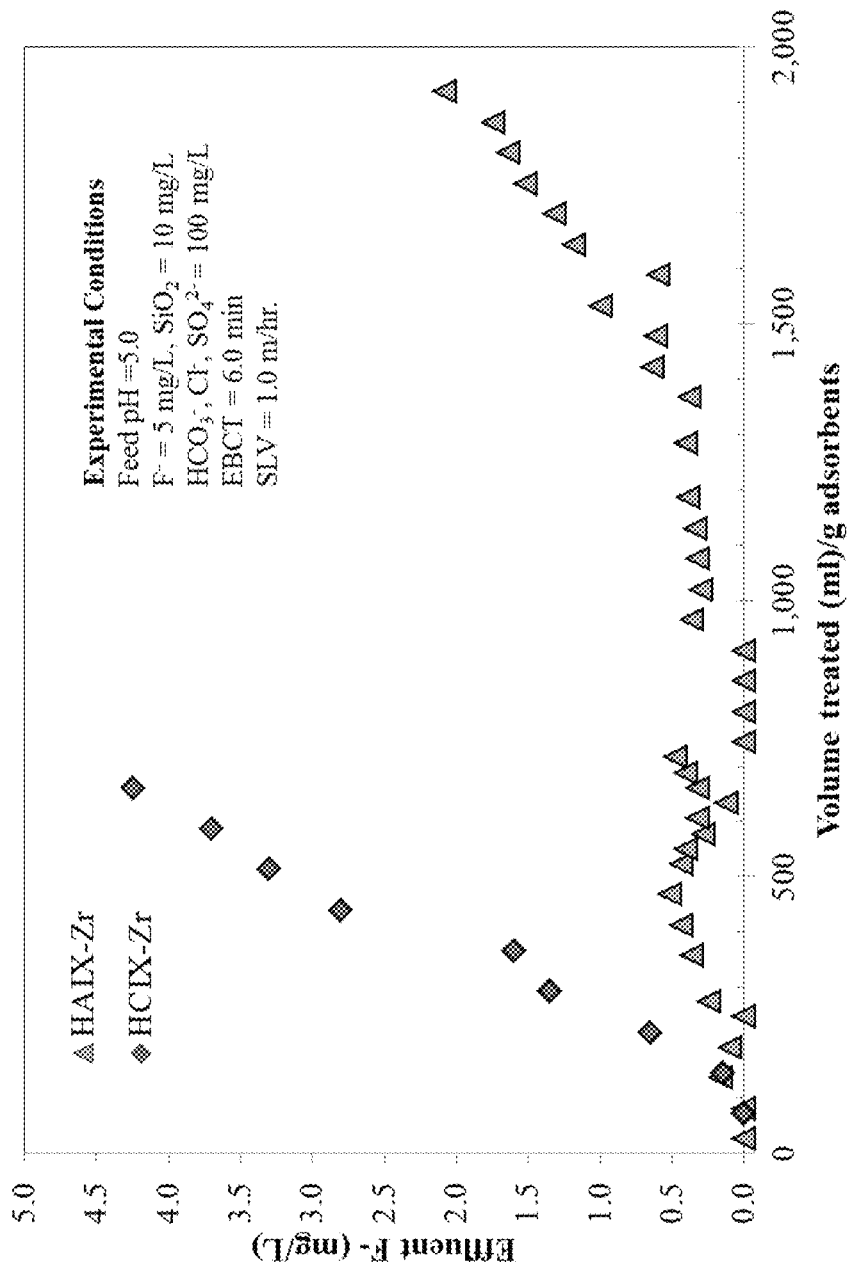
FIG. 10 is a graph showing comparison of effluent histories of the runs of FIG. 8.

FIG. 8 illustrates the removal of fluoride using the hybrid anion exchanger. A HAIX column was fed with a solution containing fluoride along with other commonly encountered anions. Specifically the influent contained 5.0 mg/L fluoride, 100 mg/L Cl$^-$, $SO_4^{2-}$, and $HCO_3^-$, and had a pH of 5.0-5.5. FIG. 9 illustrates the regenerant profiles. The effluent history for fluoride, as depicted in FIG. 10, confirms the ability of HAIX-Zr to remove fluoride selectively in the presence of other competing anions, namely, chloride and sulfate. In comparison with activated alumina, HAIX-Zr exhibited higher capacity.

Numerous modifications can be made to the invention as described. As indicated previously, any of a wide variety of anion exchange resin can be used to carry out the selective removal of ligands. For example, as an alternative to strong-base anion exchange resin having quaternary ammonium functional groups with a positively charged nitrogen atom, other anion exchange material can be used, such as weak base organic ion exchange resin beads containing primary, secondary or tertiary amine groups or a mixture thereof; organic ion exchange beads having a polystyrene or polystyrene/divinylbenzene matrix; organic ion exchange resin beads having a polyacrylic matrix; organic or inorganic membranes; and polymeric fiber or fibrous anion exchange materials. In principle, any zirconium salt including zirconium oxide and hydroxide can be used as zirconium source, preferably a pre-calcined zirconium oxide. The mixed organic solvent/acid solution used for dissolved zirconium oxide can be prepared from different solvent and acid. The solvent can be prepared from methyl alcohol, ethyl alcohol, and other organic solvent. The acid used in the zirconium preparation can be varied from sulfuric acid, hydrochloric acid, hydrogen fluoride or any combination thereof. The hydrated zirconium oxide particles precipitate in the anion exchange material can be in many forms including amorphous, cubic crystal, and monoclinic crystal or any combination thereof. The alkaline solution used for HZrO precipitation can be different, such as sodium hydroxide, potassium hydroxide, and ammonium hydroxide. Other modifications may also be made to the apparatus and method described above without departing from the scope of the invention as defined in the following claims.

Further examples. In some examples, the methods are provided for synthesizing a selective hybrid adsorbent. For example, the method may comprise the steps of: mixing a zirconium solution with a material that exhibits anion exchange behavior; and wherein the intermediate material contains zirconium with alkaline solution, thereby precipitating and dispersing hydrated zirconium oxide particles within a gel phase and impregnating macropores of the anion exchanging material to thereby produce a hybrid adsorbent for binding anions and ligands.

In some examples, pre-calcined zirconium oxide or hydroxide is a starting material. The method can include a step of preparing the zirconium solution from pre-calcined zirconium oxide using a mixture of organic solvent and strong acid. The impregnating can be followed by rinsing. A step of reacting of dried intermediate zirconium containing material is followed by the step of contacting alkaline solution. A step of precipitation can be followed by the step of water rinsing, washing the adsorbent with acetone, and followed by air dried at room temperature. A step of mixing zirconium solution can be air dried, or otherwise dried, without rinsing, and can involve precipitating HZrO inside the hybrid material, followed by water washing and acetone rinsing, for example, which can be repeated.

In still further examples, the material that exhibits anion exchange behavior is a polymeric anion exchange resin. The material that exhibits anion exchange behavior may comprise strong base organic ion exchange resin beads containing quaternary ammonium groups with a positively charge nitrogen atom. Further, the material that exhibits anion exchange behavior comprises weak base organic ion exchange resin beads containing primary, secondary or tertiary amine groups or a mixture thereof. The material that exhibits anion exchange behavior may comprise organic ion exchange resin beads having a polystyrene or polyacrylic matrix. A precipitate and dispersed metal may comprise an oxygen-containing compound of zirconium. The zirconium solution may contain methyl alcohol mixed with sulfuric acid.

In another example, an adsorbent is provided for the selective removal of ligands from fluid, including fluoride, said adsorbent comprising a polymeric anion exchange resin containing particles of an oxygen-containing compound of iron dispersed throughout the resin.

The Donnan Membrane Effect by the Host Polymer.

In order to distinguish the Donnan membrane effect exerted by the host ion exchange materials, zirconium oxide nanoparticles were separately dispersed within a macroporous cation exchange resin (Purolite C-145, Purolite Co., Philadelphia) following a protocol described earlier. The zirconium oxide content of the resulting hybrid cation exchange resin, HCIX-Zr, was 12% as Zr. Two separate fixed-bed column runs were carried out using HCIX-Zr and HAIX-Zr for fluoride removal, all other conditions remaining identical. FIG. 10 shows the comparison of fluoride effluent histories between the two runs; note that in spite of near-similar ZrO2 content, HAIX-Zr offers much greater fluoride removal capacity than ZCIX-Zr. The two polymeric ion exchanger host materials, namely, Purolite C-145 and Purolite A-500 are characterized as being macroporous with polystyrene matrix and divinylbenzene matrices. They are different from each other only with respect to their functional groups. While Purolite C-145 has negatively charged sulfonic acid functional groups, Purolite A-500 has quaternary ammonium functional groups with fixed positive charges. These observations further reveal that while ZrO2 nanoparticles offer high fluoride selectivity, the Donnan membrane effect exerted by the covalently attached quaternary ammonium functional groups in the host anion exchanger greatly enhance the permeation of fluoride anion within the hybrid sorbent i.e., surface sorption sites of zirconium oxide nanoparticles are more accessible when anion exchange resins are used as host materials.

Chemical Stability and Amorphous Structure of the Nanosorbent.

To further investigate the chemical stability or dissolution of HAIX-Zr and AA materials, 100 mg of each material was added to 200 ml of water and shaken in a gyratory shaker at different pHs for 72 hours. Solution pH was adjusted with dilute HCl or NaOH and the dissolved aluminum or zirconium in the residual solution was analyzed using Inductively Coupled Plasma (ICP) spectrophotometer (Perkin Elmer Model Optima 2100 DV).

Figure 11:
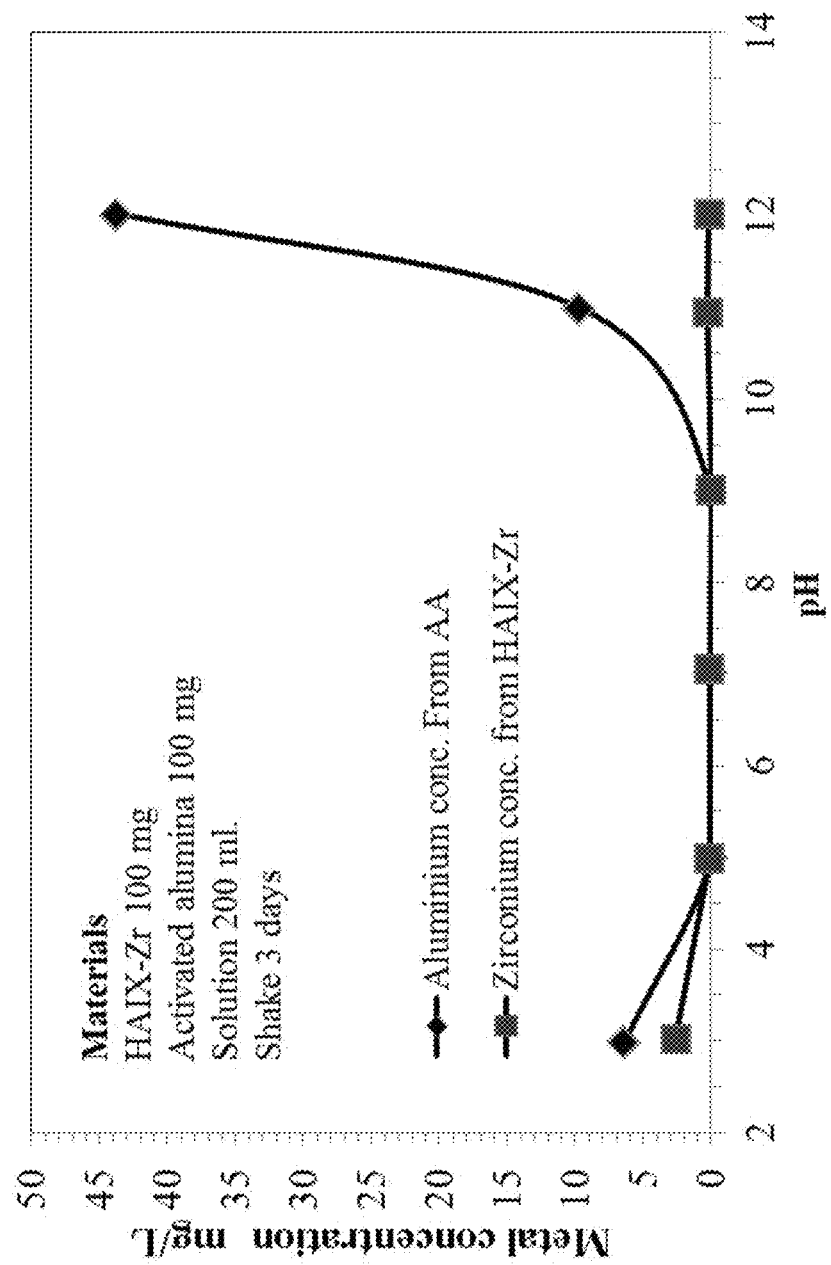
FIG. 11 is a graph showing shows plots of dissolved zirconium from HAIX-Zr and aluminum from AA at different pHs.
Figure 12:
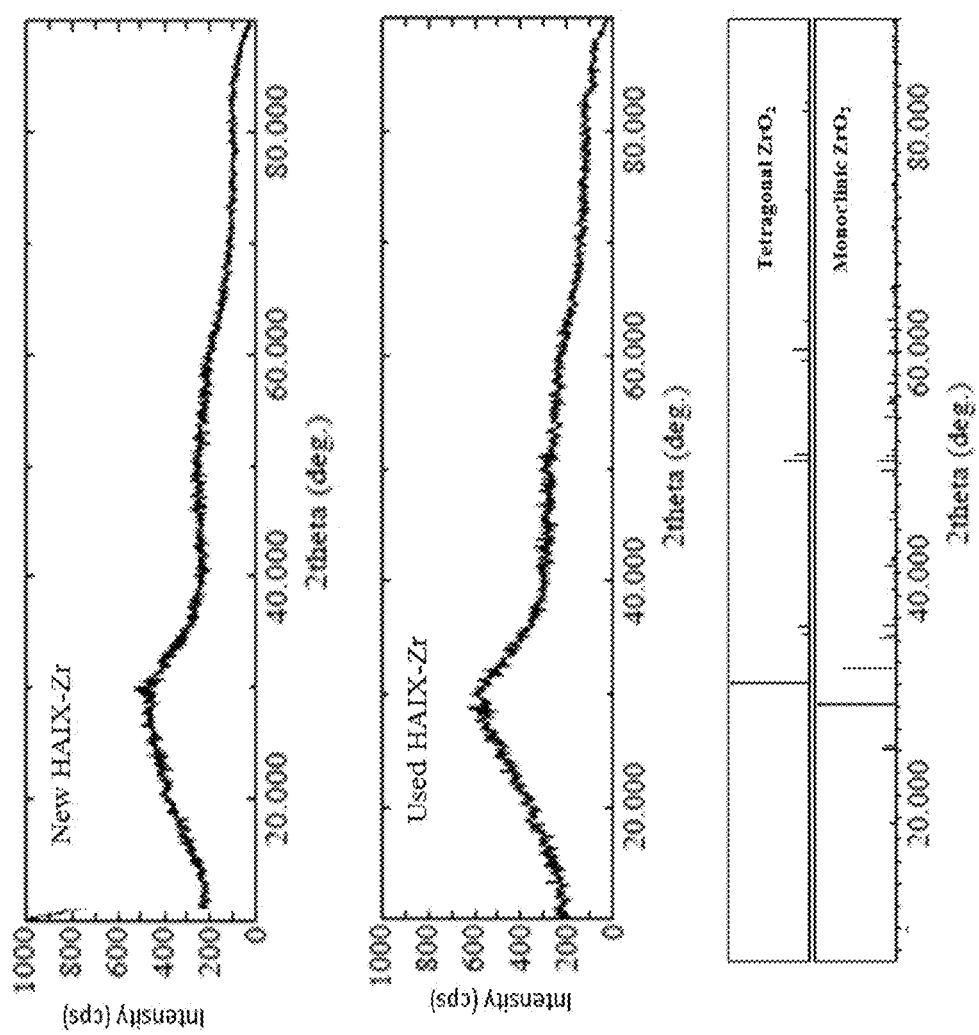
FIG. 12 is X-ray diffractograms (XRD) obtained for sliced HAIX-Zr particles.

FIG. 11 shows plots of dissolved zirconium from HAIX-Zr and aluminum from AA at different pHs. Note that HAIX-Zr is practically insoluble in the entire pH range of service and regeneration, from 4 to 12. At pH≤3.0, minor dissolution of zirconium oxide was observed. In contrast, AA was chemically far more unstable especially at alkaline condition during the regeneration process; over 40 mg/l of dissolved Al was recorded. It is postulated that enhanced chemical dissolution during regeneration and physical attrition caused by lengthy column runs are responsible for relatively high fragmentation of AA particles compared to HAIX-Zr. With ageing and exposure to alkaline pH, it has been reported that amorphous metal oxides tend to transform into more crystalline structure. In order to further confirm whether the amorphous structure of zirconium oxide particles change with service-regeneration cycles of operation, X-ray diffractograms (XRD) were obtained for sliced HAIX-Zr particles using Rikagu Model Miniflex II for both fresh materials and after two cycles of operation. FIG. 12 includes those XRDs and related data. Note that the sliced HAIX-Zr particles show no distinguishable peaks i.e., zirconium oxide structure is near-completely amorphous. No enhanced crystallinity is observed even after two cycles of operation.

Numerous modifications can be made to the invention as described. As indicated previously, any of a wide variety of anion exchange resin can be used to carry out the selective removal of ligands. For example, as an alternative to strong-base anion exchange resin having quaternary ammonium functional groups with a positively charged nitrogen atom, other anion exchange material can be used, such as weak base organic ion exchange resin beads containing primary, secondary or tertiary amine groups or a mixture thereof; organic ion exchange beads having a polystyrene or polystyrene/divinylbenzene matrix; organic ion exchange resin beads having a polyacrylic matrix; organic or inorganic membranes; and polymeric fiber or fibrous anion exchange materials.

In principle, any zirconium salt including zirconium oxide and hydroxide can be used as zirconium source, preferably a pre-calcined zirconium oxide. The mixed organic solvent/acid solution used for dissolved zirconium oxide can be prepared from different solvent and acid. The solvent can be prepared from methyl alcohol, ethyl alcohol, and other organic solvent. The acid used in the zirconium preparation can be varied from sulfuric acid, hydrochloric acid, hydrogen fluoride or any combination thereof. The hydrated zirconium oxide particles precipitate in the anion exchange material can be in many forms including amorphous, cubic crystal, and monoclinic crystal or any combination thereof. The alkaline solution used for HZrO precipitation can be different, such as sodium hydroxide, potassium hydroxide, and ammonium hydroxide.

Other modifications may also be made to the apparatus and method described above without departing from the scope of the invention as defined in the following claims.

The invention claimed is:

1. A method of preparing a hybrid anion exchange resin, the method comprising the steps of:
    preparing a zirconium solution by dissolving zirconium oxide into a solution comprising an organic solvent and an acid;
    bringing a polymeric anion exchange resin in contact with the zirconium solution to form a resin-zirconium material;
    drying the resin-zirconium material;
    subsequently contacting the dried resin-zirconium material with an aqueous alkaline solution to precipitate a zirconium compound within a gel phase of the anion exchange resin; and
    after the step of contacting, washing the anion exchange resin an aqueous wash liquid, followed by optionally rinsing with a non-aqueous rinse liquid, and then drying to yield a dried zirconium-impregnated anion exchange resin impregnated with at least one of a an oxygen-containing compound of zirconium, wherein the zirconium-impregnated anion exchange resin is suitable for use in removing at least one contaminant from a liquid, the contaminant selected from the group consisting of arsenate, arsenite, fluoride, phosphate, and selenite and combinations thereof.

2. The method of claim 1, wherein the oxygen-containing compound is amorphous.

3. The method of claim 2, wherein the oxygen-containing compound of zirconium is selected from the group consisting of hydrated zirconium, HZrO, and combinations thereof.

4. The method of claim 3, wherein the solution comprising an organic solvent and an acid comprises at least one organic solvent selected from the group consisting of methyl alcohol, ethyl alcohol, and acetone, and combinations thereof.

5. The method of claim 4, wherein the solution comprising an organic solvent and an acid comprises at least one acid selected from the group consisting of sulfuric acid, hydrochloric acid, and combinations thereof.

6. The method of claim 5, wherein the polymeric anion exchange resin comprises at least one exchange resin comprising a matrix comprising at least one of a macroporous and or gel polystyrene, polystyrene/divinylbenzene, polyacrylic, and combinations thereof.

7. The method of claim 5, wherein the polymeric anion exchange resin comprises at least one of macroporous anion exchange resin or fiber, membrane material that exhibits anion exchange behavior, strong base anion exchanger material containing quaternary ammonium functional groups, and weak base anion exchanger material containing at least one amine group selected from the group consisting of primary, secondary, and tertiary amine groups, and combinations thereof.

8. The method of claim 5, wherein the aqueous alkaline solution comprises at least one of sodium hydroxide, potassium hydroxide, ammonium hydroxide, and combinations thereof.

9. The method of claim 6, wherein the oxygen-containing compound of zirconium comprises hydrated zirconium.

10. The method of claim 9, wherein the aqueous wash liquid consists of water.

11. The method of claim 10, wherein the non-aqueous rinse liquid comprises at least one of acetone, ethyl alcohol, and methyl alcohol.

12. The method of claim 11, wherein the zirconium solution is prepared using at least one chemical selected from the group consisting of pre-calcined zirconium oxide, pre-calcined zirconium hydroxide, zirconium oxychloride, zirconium nitrate, and combinations thereof.

13. The method of claim 2, further comprising the step of releasing the contaminant from the zirconium-impregnated anion exchange resin.

14. The method of claim 13, wherein the step of releasing the contaminant includes a step of regenerating the zirconium-impregnated anion exchange resin without crystallizing the amorphous oxygen-containing zirconium compounds.

15. The method of claim 14, wherein the step of regenerating can be performed in a plurality of cycles without crystallizing the amorphous oxygen-containing zirconium compounds service-regeneration cycles of operation.

16. The method of claim 2, wherein the zirconium-impregnated anion exchange resin comprises amorphous zirconium oxide particles.

17. The method of claim 16, wherein the anionic exchange material comprises quaternary ammonium functional groups with positive charges.

18. The method of claim 17, wherein the zirconium-impregnated anion exchange resin comprises HZrO agglomerates.

19. The method of claim 18, wherein the HZrO agglomerates are encapsulated within beads of the anion exchange resin.

20. A zirconium-impregnated anion exchange resin prepared by the method of claim 2.

21. A zirconium-impregnated anion exchange resin prepared by the method of claim 18.

* * * * *